United States Patent

[11] 3,582,630

| [72] | Inventor | Jan E. Koetsier |
| --- | --- | --- |
| | | Amsterdam, Netherlands |
| [21] | Appl. No | 825,681 |
| [22] | Filed | May 19, 1969 |
| [45] | Patented | June 1, 1971 |
| [73] | Assignee | Shell Oil Company |
| | | New York, N.Y. |
| [32] | Priority | July 9, 1968 |
| [33] | | Great Britain |
| [31] | | 32614/68 |

[54] PROCESS AND APPARATUS FOR CONTROLLING A FURNACE
6 Claims, 1 Drawing Fig.

[52] U.S. Cl. .................................................... 235/151.1, 165/101
[51] Int. Cl. ..................................................... G05 13/02, F28f 27/02

[50] Field of Search ......................................... 235/151.1, 151.12; 122/451.1, 451.1 S, 451.1 R; 165/101

[56] References Cited
UNITED STATES PATENTS
3,167,113 1/1965 Kleiss ........................... 165/1
3,394,053 7/1968 Shinskey ..................... 235/151.12(X)

Primary Examiner—Eugene G. Botz
Attorneys—Theodore E. Bieber and J. H. Mc Carthy ABSTRACT: A control system for a furnace having at least two parallel heating coils wherein the average exit temperature of all the coils is computed and used to control the flows to the individual coils whereby the exit temperature of each coil approaches the average.

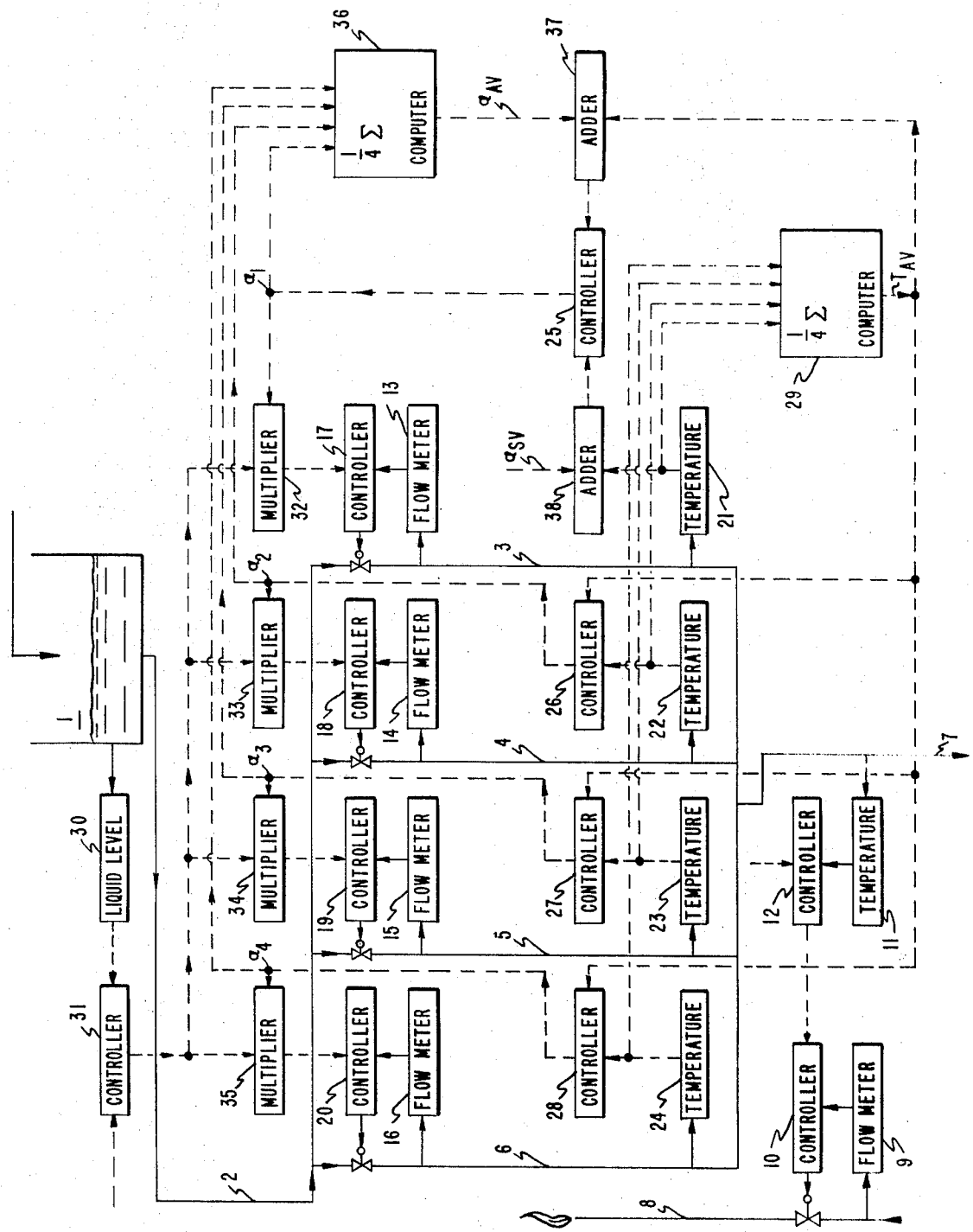

PROCESS AND APPARATUS FOR CONTROLLING A FURNACE

BACKGROUND OF THE INVENTION

The invention relates to a process and an apparatus for heating and/or vaporizing a stream of a medium in a furnace containing at least two coils arranged in parallel.

With furnaces containing coils arranged in parallel the flow of the medium through each coil is adjusted individually. This is necessary in order to prevent local overheating of a pipe section and/or of the medium and also to ensure that the heat loads on the individual coils differ as little as possible. Industrial heating furnaces are mostly being operated continuously for very long periods. With these furnaces it is not sufficient to maintain a specific distribution of the incoming flow over the coils once this distribution has been decided upon, because influences occur that make it necessary to vary it. Examples of such influences are: changes in the heat production, changes in the position of the flame, fouling of part of the tubes, weather conditions.

As a rule the flow entering the furnace should remain constant; at least, it should be possible for it to be adjusted independently. In that case, however, special provisions are required for the adjustment of the flows through the coils, because interaction cannot then be prevented. For example, when in a specific coil the flow has to be increased because there is a risk of overheating, then one or more flows through other coils will have to be decreased, but this has to be done in such a way that no overheating occurs in those other coils.

BRIEF SUMMARY OF THE INVENTION.

For this control problem a unique solution has been found, which provides for the interactions to be processed to separate adjustments of the flows through the individual coils and which meets the conditions concerning temperature, prevention of overheating and independent adjustment of the total flow through the furnace, it being possible for the control system to operate fully automatically.

The invention measures the exit temperature of the fluid from each coil and computes the average exit temperature. The exit temperature of the fluid from each coil is compared with the computed average temperature and the flow to each coil adjusted accordingly. The temperature of the flow from the furnace is measured and supplied to a controller whose set point is varied to vary the exit temperature of the fluid from the furnace. The signal from the controller is used to control the heat supplied to the furnace.

BRIEF DESCRIPTION OF THE DRAWING

The invention will be more easily understood from the following detailed description of a preferred embodiment when taken in conjunction with the attached drawing showing in block diagram form a preferred embodiment of the invention.

DESCRIPTION OF PREFERRED EMBODIMENT

The invention relates to a process for heating and/or vaporizing a stream of a medium in a furnace containing at least two coils arranged in parallel, over which coils the amount of that medium—entering at a rate F—is distributed. The rates of flow $F_j$ through the individual coils are adjusted in such a way that the temperatures $T_j$ of these flows at the ends of the individual coils differ as little as possible, and by which each rate of flow $F_j$ when a change in a temperature $T_j$ occurs is changed in proportion to the integral $\int (T_j - T_{AV})dt$, where $T_{AV}$ is the arithmetic mean of the temperatures $T_j$. "Rate of flow" is understood here to mean the volume or the mass of the medium passing per unit time.

An explanation of the effect of the process according to the invention will be given with the aid of the following preferred version involving automatic operation.

This version comprises the following actions:

a. the temperature $T_j$ of each individual coil is regularly measured at the end thereof,
b. the arithmetic mean $$T_{AV} = \frac{1}{n} \sum_{j=1}^{n} T_j$$

is regularly computed, c. for each coil $T_j$ is compared with $T_{AV}$ in a controller with integral action, which results in an output signal $\alpha_j$,
d. correcting units for the flows $F_j$ in the individual coils are adjusted with the aid of the corresponding signals $\alpha_j$. The said actions occur regularly, which is taken to comprise both continuous and periodical actions.

Let us assume that a furnace contains four coils. Then:

$$T_{AV} = \frac{1}{4} \sum_{j=1}^{n} = \frac{1}{4}(T_1 + T_2 + T_3 + T_4)$$

The output signal $\alpha_j$ of a controller with integral action is:

$$\alpha_j = \frac{1}{\tau} \int (T_j - T_{AV}) dt$$

where $\tau$ is the reset time.

During a short time $\Delta t$ the output signal $60_1$ of the controller for the first coil changes by:

$$\Delta \alpha_1 = \frac{\Delta t}{\tau} \left( T_1 - \frac{1}{4}T_1 - \frac{1}{4}T_2 - \frac{1}{4}T_3 - \frac{1}{4}T_4 \right)$$

Similarly:

$$\Delta \alpha_2 = \frac{\Delta t}{\tau} \left( T_2 - \frac{1}{4}T_1 - \frac{1}{4}T_2 - \frac{1}{4}T_3 - \frac{1}{4}T_4 \right)$$

$$\Delta \alpha_3 = \frac{\Delta t}{\tau} \left( T_3 - \frac{1}{4}T_1 - \frac{1}{4}T_2 - \frac{1}{4}T_3 - \frac{1}{4}T_4 \right)$$

$$\Delta \alpha_4 = \frac{\Delta t}{\tau} \left( T_4 - \frac{1}{4}T_1 - \frac{1}{4}T_2 - \frac{1}{4}T_3 - \frac{1}{4}T_4 \right)$$

From this it follows for the sum of all variations $\Delta \alpha_j$ that:

$$\sum_{j=1}^{4} \Delta \alpha_j = 0$$

As a result of the change $\Delta \alpha_j$ in an output signal $\alpha_j$ there occurs in a flow $F_j$ a change $\Delta F_j$ which is equal to:

$$\Delta F_j = \frac{\Delta \alpha_j}{\alpha_j} F_j$$

The sum of the changes $\Delta F_j$ for four coils is:

$$\sum_{j=1}^{4} \Delta F_j = \frac{F_j}{\alpha_j} \sum_{j=1}^{4} \Delta \alpha_j, \text{ since } \frac{F_j}{\alpha_j} = \frac{F}{\sum_{j=1}^{4} \alpha_j}$$

It has already been found that $$\sum_{j=1}^{4} \Delta \alpha_j = 0$$

so that, also $$\sum_{j=1}^{4} \Delta F_j = 0$$

which means that the total flow $F$ does not change as a result of the control actions.

The above effect is obtained because $T_{AV}$ is the arithmetic mean of the temperatures $T_j$. In general, $T_{AV}$ is not equal to the temperature $T_o$ of the flows $F_j$ having been combined into a single flow. The heat production in the furnace can be controlled to maintain a desired value for the temperature $T_o$. For this purpose use can be made of a controller for the supply of fuel and air to the burner, which controller compares the measured value $T_o$ with the set value for that temperature.

Control of the temperature $T_o$ determines the total amount of heat $\Phi$ supplied per unit time. The control system automatically adjusts the flows $F_j$ in such a way that the following relation is satisfied:

$$\frac{F_j}{\sum_{j=1}^{4} F_j} = \frac{\phi_j}{\sum_{j=1}^{4} \phi_j}$$

where $\Phi_j$ is the amount of heat supplied per unit time to a flow $F_j$. From the heat balance for the flows $F_j$:

$$f_v \cdot c_v \cdot F_j + c_w \cdot F_j \cdot (T_j - T_{in}) = c \cdot \Phi_j,$$

where $T_{in}$ is the temperature of the incoming flow $F$; $c_w$ is the specific heat of the feed; $c_r$ is the heat of evaporation of the feed; and $f_r$ is the vaporized fraction of the feed flow. It then follows that the temperatures $T_j$ are equal. In addition, from the overall heat balance:

$$f_v \cdot c_v \cdot \sum_{j=1}^{4} F_j + c_w \cdot \sum_{j=1}^{4} F_j (T_j - T_{in}) = c_w \cdot F (T_o - T_{in}) + f_v \cdot c_v \cdot F$$

It follows that the temperatures $T_j$ then are also equal to the outlet temperature $T$ of the furnace.

The incoming flow $F$ of the medium is not therefore influenced by the control actions described hereinbefore. This flow $F$ can be adjusted independently. However, a change in the flow $F$ implicates a change in the flows $F_j$. The resulting control problem can be solved by multiplication of the signals $\alpha_j$ by a factor corresponding to the flow $F$, the signals thus obtained being employed for adjusting the flows $F_j$. Consequently, the signals $\alpha_j$ are adapted to the total flow $F$ that has to pass through the furnace without the advantages of the adjustments of the flows $F_j$ according to the invention being in any way affected.

The process described so far can be supplemented with a procedure by which drift of the signals $\alpha_j$ is corrected. It has been found that the signals $\alpha_j$ sometimes change slowly without the ratio between them being changed. A correction for this drift is obtained when:

e. the arithmetic mean $$\alpha_{AV} = \frac{1}{n} \sum_{j=1}^{n} \alpha_j$$

is regularly determined, f. the sum of $\alpha_{AV}$ and $T_{AV}$ is regularly determined,
g. the sum of one of the temperatures $T_j$ and $\alpha_{SV}$ is regularly determined, $\alpha_{SV}$ representing a desired value for $\alpha_{AV}$,
h. in one of the controllers mentioned under (c), corresponding to the temperature $T_j$ mentioned under (g), the sums mentioned under (f) and (g) are compared, which yields a value $\alpha_j$ which is further used as such in the manner described hereinbefore.

The output signal from the controller in question now becomes:

$$\alpha_1 = \frac{1}{\tau} \int (T_1 - T_{AV}) dt + \frac{1}{\tau} \int (\alpha_{SV} - \alpha_{AV}) dt$$

In this way it is ensured that the average value $\alpha_{AV}$ is kept at a constant, set value $\alpha_{SV}$, by which the drift correction has been accomplished.

The process according to the invention can be carried out automatically with the aid of conventional measuring, computing and control equipment. The operation of this equipment may be pneumatic, electric, or mechanical, or may be a combination of these modes of operation.

The said calculations and control actions may very suitably be performed with a digital computing instrument according to the technique of direct digital control.

An apparatus suitable for carrying out the process will now be described in more detail with reference to the drawing in which symbols have been used for conventional measuring, computing and control equipment.

From a vessel 1, in this case the bottom of a column, a medium to be heated, for instance a liquid, flows via line 2 to a furnace with in this case comprises four coils 3, 4, 5, and 6, arranged in parallel. The combined flow of liquid leaves the furnace via line 7. A burner 8 provides heat for the furnace. A flowmeter 9 and a controller 10 provide for the adjustment of the fuel supply to the burner. The set value for controller 10 is derived from a meter 11 and controller 12 for the temperature of the liquid flow from the furnace through line 7. This temperature can be adjusted independently by selecting the set value for controller 12.

The rest of the control system provides for the distribution of the liquid supplied over the four coils 3, 4, 5 and 6. Each coil is provided with a flowmeter 13—16 and a controller 17—20. These control circuits in the first instance keeps the liquid flows $F_j$ through the individual coils constant. At the end of each coil there is a meter measuring the temperature 21—24 and a controller 25—28. The signals from the meters 21—24 measuring the temperature also are supplied to a computing element 29, where the average $T_{AV}$ of the four temperatures $T_j$ is calculated. The value $T_{AV}$ constitutes the set value for the four controllers 25—28. These controllers have integral action with reset time $\tau$. Each value $\alpha_j$ determines the set value for one of the flow controllers 17—20 if the level of the liquid in column 1 does not change. In this way the liquid flow through each coil is adjusted in proportion to the deviation from the average value of the temperature. The sum of those deviations is always zero. Hence, it follows that the sum of the flows $F_j$ remains constant.

In this case variation of the amount of liquid supplied is handled as follows: level gauge 30 measures the liquid level in the column and supplies a signal to controller 31. The output signal from controller 31 passes to the computing elements 32—35. In these computing or multiplying elements the values $\alpha_j$ are multiplied by the said output signal. As long as the level of the liquid in column 1 does not change, the values $\alpha_j$ are multiplied by a constant factor. Upon an increase in the level of the liquid in 1 the controllers 17—20 will cause the valves in the coils 3—6 to simultaneously open farther, and vice versa. The temperatures $T_j$ of the individual coils are equally influenced by variations in the total flow of liquid (output signal from controller 31) or by variations in the flow of fuel (controllers 12 and 10).

The correction for drift of the values $\alpha_j$ is accomplished as follows: The values $\alpha_j$ also pass to a computing element 36, where the average $\alpha_{AV}$ of the four values $\alpha_j$ is calculated. The set value for controller 25 is now supplied by element 37 from the sum of $\alpha_{AV}$ and $T_{AV}$ and the input signal by element 38 from the sum of $T_1$ and $\alpha_{SV}$. Here $\alpha_{SV}$ represents the desired value for $\alpha_{AV}$.

While no specific devices have been specified in the above description, various commercially available devices can be used. For example, measuring devices that supply analog signals can be used in combination with electronic controllers having reset, rate and integral actions. Operational amplifiers having proper feedback circuits can be used to perform the various multiplying and summing operations. If desired, the various operations can be carried out using pneumatic components. Of course, the various measurements must be made using components that supply pneumatic output signals. If desired, electrical signals could be converted to pneumatic signals using various conversion devices.

I claim as my invention:

1. A process for controlling a furnace having at least two coils disposed in parallel, said process comprising:
    measuring the total flow through the coils;
    measuring the exit temperature of each coil;
    combining all of the measured exit temperatures to obtain the average exit temperature;
    comparing said average exit temperature with the measured exit temperature of each coil to generate a temperature error signal for each coil;
    combining said temperature error signal for each coil with a signal representing the total flow to generate a flow control signal for each coil;
    measuring the flow through each coil;

comparing said measured flow for each coil with the flow control signal for the coil to generate a flow control error signal for each coil; and utilizing said flow control error signal for each coil to control the flow through the coil.

2. The process of claim 1 wherein the exit temperature of the total flow is measured and utilized to control the heat supplied to the furnace.

3. The process of claim 1 wherein temperature error signals are combined to obtain the average temperature error signal, combining the average temperature error signal with the average exit temperature to obtain a second temperature error signal; combining said second temperature error signal with the temperature error signal of each coil to obtain a third temperature error signal and utilizing said third temperature error signal and said total flow signal to control the flow through said coils.

4. An apparatus for controlling a furnace having at least two coils disposed in parallel, said apparatus comprising:

a temperature-measuring means disposed to measure the exit temperature of each coil;

a temperature controller for each coil, said temperature controller having integral action and a set point, the temperature-measuring means of each coil being coupled to the temperature controller of each coil;

a computing means, all of said temperature-measuring means being coupled to said computing means, said computing means providing an output signal representing the average value of said exit temperatures, the output of said computing means being coupled to the set point of each of said temperature controllers;

a flow-measuring means disposed to measure the flow in each coil;

a flow controller for each coil, said flow controller having a set point, said flow-measuring means of each coil being coupled to said flow controller of each coil and said temperature controller of each coil being coupled to the set point of said flow controller of each coil; and flow control means disposed in each coil to control the flow therethrough, the flow control means of each coil being coupled to the flow control means of the coil.

5. The apparatus of claim 4 and, in addition, another temperature-measuring means disposed to measure the exit temperature of the combined flow from all of the coils; a controller, said another temperature-measuring means being coupled to said controller and said controller being disposed to control the heat supplied to the furnace.

6. The apparatus of claim 4 and, in addition, a total flow-measuring means disposed to measure the total flow entering said furnace; a computing means for each coil, said total flow-measuring means and said temperature controller for each coil being coupled to the computing means for each coil, said computing means for each coil being coupled to the set point of the flow controller for each coil.